(12) United States Patent
Lachance et al.

(10) Patent No.: US 6,859,583 B2
(45) Date of Patent: Feb. 22, 2005

(54) FINE-TUNING ASSEMBLY FOR OPTICAL GRATINGS

(75) Inventors: Richard L. Lachance, Ste-Foy (CA); Andre Vovan, Quebec (CA)

(73) Assignee: Teraxion Inc., Sainte-Foy (CA)

( * ) Notice: Subject to any disclaimer, the term of this patent is extended or adjusted under 35 U.S.C. 154(b) by 498 days.

(21) Appl. No.: 10/081,733

(22) Filed: Feb. 22, 2002

(65) Prior Publication Data

US 2002/0150335 A1 Oct. 17, 2002

Related U.S. Application Data

(60) Provisional application No. 60/270,196, filed on Feb. 22, 2001.

(51) Int. Cl.⁷ .............................. G02B 6/34; G02B 6/00
(52) U.S. Cl. ............................ 385/37; 385/10; 385/13; 385/137
(58) Field of Search .............................. 385/37, 10, 13, 385/137

(56) References Cited

U.S. PATENT DOCUMENTS

| | | | |
|---|---|---|---|
| 4,936,646 A | 6/1990 | Enochs et al. ............. | 350/96.2 |
| 5,007,705 A | 4/1991 | Morey et al. ............. | 350/96.29 |
| 5,042,898 A | 8/1991 | Morey et al. .................. | 385/37 |
| 5,694,503 A | 12/1997 | Fleming et al. ............... | 385/37 |
| 5,774,619 A | 6/1998 | Bruesselbach | |
| 5,844,667 A | 12/1998 | Maron | |
| 5,991,483 A | 11/1999 | Engelberth .................... | 385/37 |
| 6,044,189 A | 3/2000 | Miller .......................... | 385/37 |
| 6,087,280 A | 7/2000 | Beall et al. ..................... | 501/7 |
| 6,101,301 A | 8/2000 | Engelberth et al. | |
| 6,144,789 A | 11/2000 | Engelberth et al. | |
| 6,636,667 B2 * | 10/2003 | Wang et al. .................. | 385/37 |
| 2002/0141700 A1 * | 10/2002 | Lachance et al. ............. | 385/37 |
| 2003/0072531 A1 * | 4/2003 | Putnam et al. ................ | 385/37 |

FOREIGN PATENT DOCUMENTS

| | | |
|---|---|---|
| JP | 200012184 | 4/2000 |
| WO | WO 95/30926 A1 | 11/1995 |
| WO | WO 9859267 | 12/1998 |

OTHER PUBLICATIONS

Patent Abstracts of Japan, vol. 2000 No. 7, Sep. 29, 2000 JP 2000 121844 (Furukawa Electric Co. Ltd.) Apr. 28, 2000 Abstract, figure 3.

G.W. Yoffe, P.A. Krug, F. Ouellette, and D. Thorncraft, "Temperature–compensated optical–fiber Bragg gratings" OFC, vol. 8, 1995 OSA Technical Digest Series, Paper W14, p. 134.

G W Yoffe, P.A. Krug, F. Ouellette and D.A. Thorncraft, "Passive temperature–compensating package for optical fiber gratings", Appl. Optics, vol. 34, No. 30, Oct. 1995, pp. 6859–6861.

(List continued on next page.)

*Primary Examiner*—Akm Enayet Ullah
*Assistant Examiner*—Sung Pak
(74) *Attorney, Agent, or Firm*—Darby & Darby

(57) ABSTRACT

A fine-tuning assembly for an optical grating in an optical fiber is provided. The fiber is mounted under tension in a hollow structure which has a sliding member longitudinally slideable therein. The fiber is attached to both the sliding member and hollow structure. A slanted passage is provided in the sliding member, forming a small angle with the transversal, and a wedge member is slideably inserted in this passage. To fine-tune the spectral response of the grating, the wedge member is transversally displaced without any longitudinal displacement, preferably by the action of screws, thereby pushing on its walls to longitudinally slide the sliding member and adjust the tension in the fiber.

22 Claims, 4 Drawing Sheets

OTHER PUBLICATIONS

T.E. Hammon, J. Bulman, F.Ouellette & S.B.Poole, "A temperature compensated optical fiber Bragg grating band rejection filter and wavelength reference", OECC'98 Technical Digest, pp. 350–351, 1996.

D.L. Weidman, G.H. Beall, K.C. Chyung, G.L. FranciS, R.A. Modavis, and R.M. Morena. "A novel negative expansion substrate material for athermalizing fiber Bragg gratings", 22$^{nd}$ European Conference on Optical Communication–13 ECOC'96, Oslo, Paper MoB 3.5 pp. 1–61,.63.

A.Inoue, T. Iwashima, T. Enomoto, S. Ishikawa and H. Kanamori, "Optimization of fiber Bragg grating for dense WDM transmission system", IEICE Trans. Electron. vol. E81–C, No. 8, pp. 1209–1218, Aug. 1998.

D. Weidman, "Fiber Bragg gratings enhance real–world applications", Laser Focus World, pp. 99–103; Mar. 1999.

T. Iwashima, A. inoue, M. Shigematsu, M. Nishimura, Y. Hattori, "Temperature compensation technique for fiber Bragg gratings using liquids crystalline polymer tubes", Electronics Letters, vol. 33, No. 5, pp. 417–419, Feb. 27, 1997.

S. Magne, S. Rougeault, M. Viela, and P. Ferndinand, "State–of–strain evaluation with fiber Bragg grating rosettes:application to discrimination between strain and temperature effects in fiber sensors", App.. Optics, Dec. 1997, vol. 36, No. 36, pp. 9437–9442.

V. Arya, D.W. Sherrer, A. Wang, R.O. Claus, and Mark Jones, "Application of Thin–Film Optical Filters to the Temperature Compensation of Optical Fiber Grating–Based Devices" IEEE Trans on Instrum. and Meas. vol. 46, No. 5, Oct. 1997, pp. 1173–1177.

\* cited by examiner

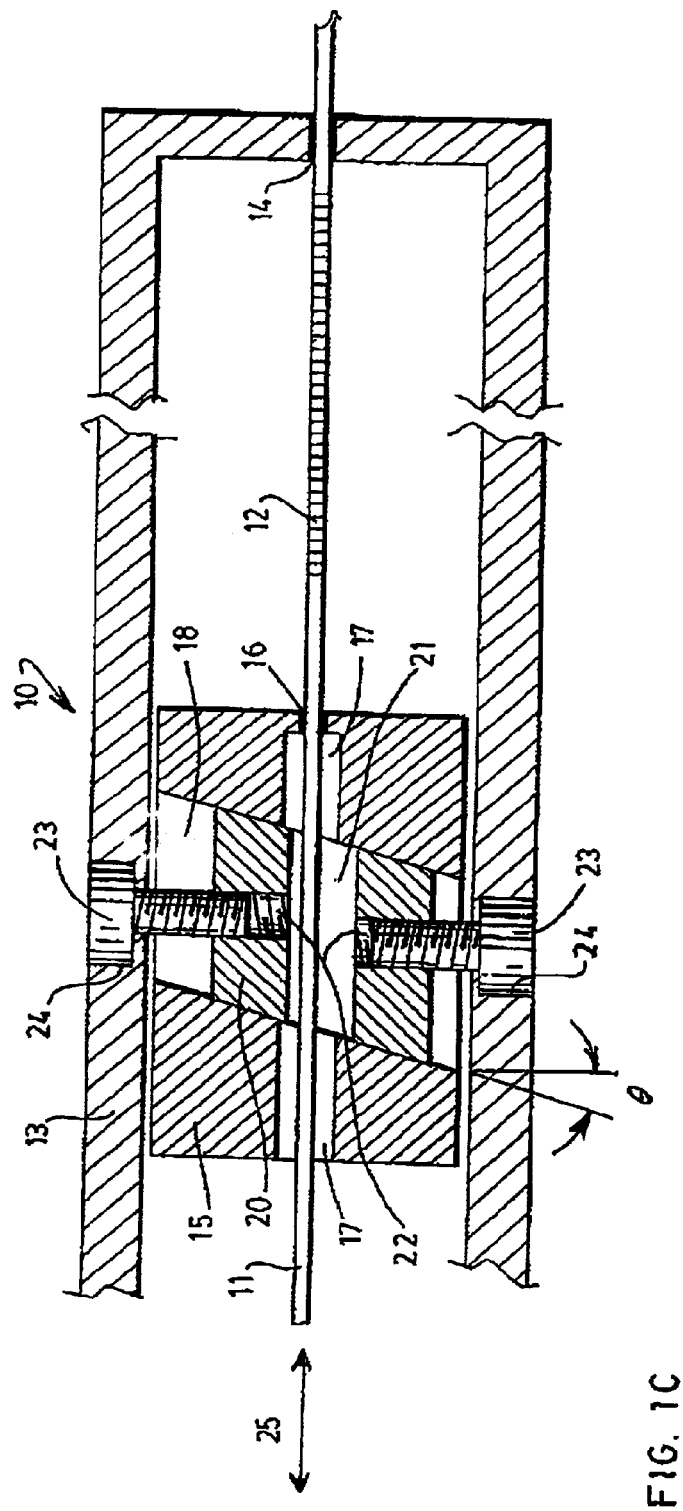
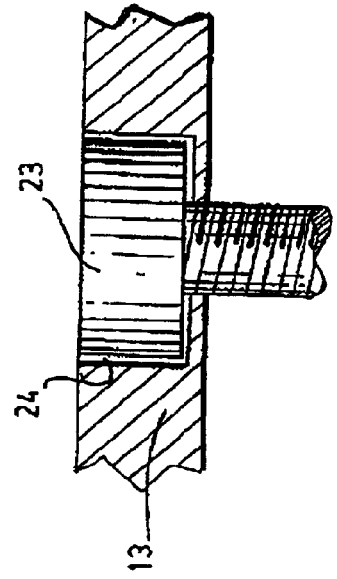
FIG. 1C
FIG. 2

FINE-TUNING ASSEMBLY FOR OPTICAL GRATINGS

This application claims the priority of U.S. Provisional Application No. 60/270,196, filed on Feb. 22, 2001 which is hereby incorporated by reference in its entirety.

FIELD OF THE INVENTION

The present invention relates to the field of optical devices and more particularly concerns a device for fine-tuning the spectral characteristics of optical gratings.

BACKGROUND OF THE INVENTION

Optical-fiber Bragg gratings (FBGs) have become essential components in the telecommunications industry, where they perform various spectral filtering operations. A fiber Bragg grating consists of a periodic modulation of the index of refraction along the core of an optical fiber. It is created by exposing a photosensitive fiber to a properly shaped intensity pattern of ultraviolet light. This light produces a permanent change in the index of refraction in selected sections of the optical fiber. The resulting optical fiber grating behaves as a wavelength-selective reflector. The reflected wavelength of light is often referred to as the grating wavelength or as the Bragg wavelength of the grating. Their stability and reliability, in conjunction with their all-guided-wave nature has made FBGs ideal candidates for fiber optic system applications.

Fiber Bragg gratings are now used extensively in the field of optical telecommunications, e.g. for Wavelength Division Multiplexing (WDM), for compensating chromatic dispersion in optical fibers, for stabilizing and flattening the gain of optical amplifiers, for stabilizing the frequency of semiconductor lasers, and more generally in various filters. They are also found in instrumentation, e.g. as narrow band wavelength-selective reflectors for fiber lasers, or as sensors for the measurement of strain, temperature, and hydrostatic pressure.

The carrying capacity of WDM systems can be increased by using more and more narrowly spaced channels within an overall transmission spectral band. This requires the use of filters with an accurately defined spectral response. The Bragg wavelength of a grating depends on the period of modulation and on the average value of the refractive index in the fiber. Both quantities can be varied by straining the optical fiber. Fine-tuning of the spectral response of a fiber Bragg grating can thus be achieved by straining the optical fiber containing said grating in a well controlled manner.

Current telecommunication applications require the Bragg wavelength of FBGs to be accurate within a few tens of picometers. This requires a submicron-level control of the length of the gratings, achievable only with a fine-tuning mechanism. Several systems have been proposed in the past to achieve this goal of precisely adjusting the wavelength of optical devices, especially in the context of athermal packaging of fiber devices.

Referring for example to U.S. Pat. No. 5,042,898 (MOREY et al.) and G. W. Yoffe, P. A. Krug, F. Ouellette, and D. A. Thorncraft, "Passive temperature-compensating package for optical fiber gratings", Appl. Optics, Vol. 34, No. 30, October 1995, pp. 6859–6861 the use of screws extending along the longitudinal axis of an optical fiber has been suggested to apply tension to a grating in this fiber. However, the accuracy of this method is limited by the number of threads per unit length on the screw. Typical implementations did not provide a sufficiently accurate control of the Bragg wavelength. To improve this accuracy, assignee's co-pending U.S. application Ser. No. 09/952.715, filed on Sep. 12, 2001, suggest the addition of a locking nut to the structure to improve the control of the Bragg wavelength. The sequential rotation of the tension screw and locking nut with respect to one another provides a better control of the axial displacement than that achievable with only the tension screw.

More elaborate methods have also been presented to improve accuracy, like differential threaded elements (U.S. Pat. No. 5,991,483 to ENGELBERTH), tweaker screws (see U.S. Pat. No. 6,101,301 to ENGELBERTH et al.) or elaborate pivoting lever systems (for example in U.S. Pat. No. 6,147,341 (LEMAIRE et al.) and U.S. Pat. No. 6,144,789 (ENGELBERTH et al.)). These systems have not proven much successful, because of implementation difficulties or a lack of mechanical stability.

OBJECTS AND SUMMARY OF THE INVENTION

It is therefore an object of the present invention to provide an advantageous device adapted for the fine-tuning of the spectral response of an optical grating.

A further object of the invention is to provide a fine-tunable grating assembly using the fine-tuning principle of the invention.

Accordingly, the present invention provides a fine-tuning assembly for an optical grating provided in an optical fiber.

The assembly first includes a hollow structure for mounting the optical fiber under tension therethrough along a longitudinal direction, and a sliding member slideable within this hollow structure along the same longitudinal direction. The sliding member has a slanted passage extending therethrough at an angle with a transversal direction. The sliding member and hollow structure respectively have a first and a second anchor point for affixing the optical fiber thereto, with the optical grating extending between the first and second anchor points.

The assembly also includes a wedge member slideable within the slanted passage without interfering with the optical fiber. Transversal displacement means for transversally displacing the wedge member are finally provided. In this manner, the sliding member is longitudinally slid within the hollow structure for finely adjusting the tension in the optical fiber and fine-tuning the optical grating.

In accordance with another aspect of the invention, there is also provided a fine-tunable optical grating assembly, which includes a hollow structure having a longitudinal direction and a transversal direction normal thereto. An optical fiber having an optical grating therein is longitudinally mounted under tension in the hollow structure. A sliding member is also inserted into the hollow structure, and is slideable therein along the longitudinal direction. The sliding member has a slanted passage extending therethrough at an angle with the transversal direction. The optical fiber is affixed to first and second anchor points respectively provided on the sliding member and hollow structure, with the optical grating extending between these first and second anchor points. A wedge member is provided and is slideable within the slanted passage without interfering with the optical fiber. The assembly also includes transversal displacement means for transversally displacing the wedge member, thereby longitudinally sliding the sliding member within the hollow structure for finely adjusting the tension in the optical fiber and fine-tuning the optical grating.

Further features and advantages of the invention will be better understood upon reading of preferred embodiments thereof with respect to the appended drawings.

BRIEF DESCRIPTION OF THE DRAWINGS

FIGS. 1A, 1B and 1C are respectively cross-sectional side views of fine-tuning tuning assemblies according to a first, a second, and a third embodiment of the invention.

FIG. 2 is an enlarged view of a screw as used in the embodiments of FIGS. 1A, 1B and 1C.

DESCRIPTION OF PREFERRED EMBODIMENTS OF THE INVENTION

A fiber Bragg grating consists of a periodic modulation of the index of refraction along the core of an optical fiber. This modulation can couple light between counter-propagating modes in a single mode optical fiber over a certain spectral domain. In other words, light of a proper wavelength is reflected when it encounters the refractive index modulation. In a uniform grating, the strongest reflection of light occurs at the Bragg wavelength λB equal to twice the effective grating period:

$$\lambda_b = 2n\Lambda \quad (1)$$

where $\Lambda$ is the spatial period of the index modulation in the fiber grating and n is the average effective refractive index of the guided mode at the position of the grating. The Bragg wavelength increases when the fiber is stretched under the action of a tensile load, leading to an increase in the modulation period $\Lambda$. This increase is partially offset by an ensuing reduction in the refractive index n through the stress-optic (or photo-elastic) effect. This situation is described by the following equation:

$$\frac{\Delta \lambda_B}{\lambda_B} = \Delta\varepsilon - p_e \Delta\varepsilon \quad (2)$$

where $P_e$ is the photo-elastic constant and $\Delta\epsilon = \Delta L/L$ is the longitudinal strain in the fiber resulting from the applied tensile load, L being the fiber length. The first term on the right hand side of the equation represents the change in the modulation period resulting from the elongation of the fiber, whereas the second one represents the change in the average refractive index resulting from the photo-elastic effect. A typical value for the photo-elastic constant Pe in a germano-silicate fiber is approximately 0.22, leading to a Bragg wavelength sensitivity of 1.2 pm/microstrain at 1550 nm. Sub-micron displacements are thus required to achieve a pm-level tuning accuracy in gratings that are a few centimeters long.

Figure 1A:
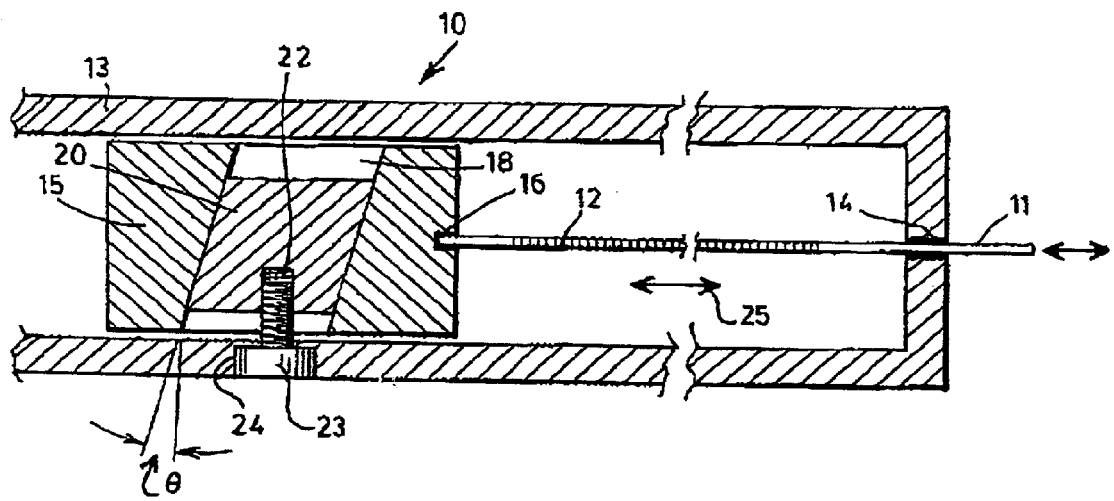

With reference to FIG. 1A, there is shown an assembly 10 for the fine wavelength tuning of an optical grating by strain adjustment in accordance with a first preferred embodiment of the invention. The system comprises a hollow structure 13 into which is provided a sliding member 15, slideable along the longitudinal direction of the hollow structure 13.

An optical fiber 11, having a fiber optical grating 12 written therein, is mounted under tension through the hollow structure 13 along the longitudinal direction. By "through" the hollow structure, it is meant that at least a portion of the fiber 11 extends inside the structure 13, but the invention is not limited to the case where the fiber 11 would extend across the entire structure 13 from one end to the other. A first and a second anchor point 16 and 14 are provided for the optical fiber 11, respectively on the sliding member 15 and the hollow structure 13. Bonding of the fiber 11 is done by any appropriate method known to those skilled in the art such as, but not limited to, soldering, brazing, epoxy bonding, glass to metal sealing, or cement bonding. In the embodiment of FIG. 1A, an end of the fiber 11 is affixed to the first anchor point 16, the fiber 11 therefore only extending partly through the hollow structure 13. Such an embodiment may for example be advantageous for applications where the optical grating 12 is used solely in reflection.

The optical fiber 11 is mounted in such a manner that the optical grating 12 extends between the first and second anchor points 16 and 14. A displacement 25 of the sliding member 15 with respect to the hollow structure 13 determines the strain in the fiber 11, and therefore the Bragg wavelength of grating 12. When the optical fiber 11 is attached to the system, a sufficient tension is applied thereon to ensure that it remains under tension whatever the position of the sliding member 15 along the hollow structure 13 allowed by the mechanical construction.

The hollow structure 13, sliding member 15 and wedge member 20 are made of any appropriate materials adapted to the manufacturing conditions of the present invention. Different components could be made of different materials. By way of example, aluminum or stainless steel could be appropriate selections, but these choices are in no way to be considered as limitative to the invention.

A slanted passage 18 forming a small angle $\theta$ with the transversal direction (normal to the longitudinal direction) is provided through the sliding member 15. This slanted passage 18 is shaped to receive a wedge member 20 which is slideable therein. The slanted walls of the wedge member 20 preferably have the same slant angle $\theta$ as the walls of the slanted passage 18.

Transversal displacement means are further provided for transversally displacing the wedge member 20. Preferably, these means are embodied by a screw 23 which is free to rotate through unthreaded screw hole 24 provided transversally in the hollow structure 13. Motion of the screw 23 towards the hollow structure is restricted by the head of the screw 23 that rests against the hollow structure at the bottom of the screw hole 24, as better seen in FIG. 2. Preferably, to prevent motion of the screw 23 outwards of the hollow structure 13, a collar 40 (also seen in FIG. 2) is provided on the screw 23 on the inside of the hollow structure 13. In an alternative embodiment, the screw hole 24 could be shaped to form a restricting lid so that the upper threads of the screw 23 act as a stop abutting on the inside wall of the hollow structure 13. A threaded cavity 22 is provided in the wedge member 20 and is disposed in alignment with the screw hole 24, for threadably receiving the screw 23. Therefore, threading or unthreading the screw 23 in the threaded cavity 22 induces a restricted transversal displacement of the wedge member 20, perpendicularly to the longitudinal direction of the hollow structure 13. The rate of motion of the wedge member 20 in the transversal direction is determined by the pitch of the threads in the threaded cavity 22. This transversal motion of the wedge member 20 induces a longitudinal displacement 25 of the sliding member 15, since the walls of the wedge member 20 slide against the walls of the slanted passage 18 in the sliding member. The longitudinal displacement 25 of the sliding member 15 varies the length of the grating 12 and tunes its characteristic spectral response. As aforementioned, in order for this tuning mechanism to operate properly, the optical fiber 11 must remain under tension between anchor points 14 and 16 for all of the longitudinal positions of the sliding member 15 allowed by the system.

Figure 1B:
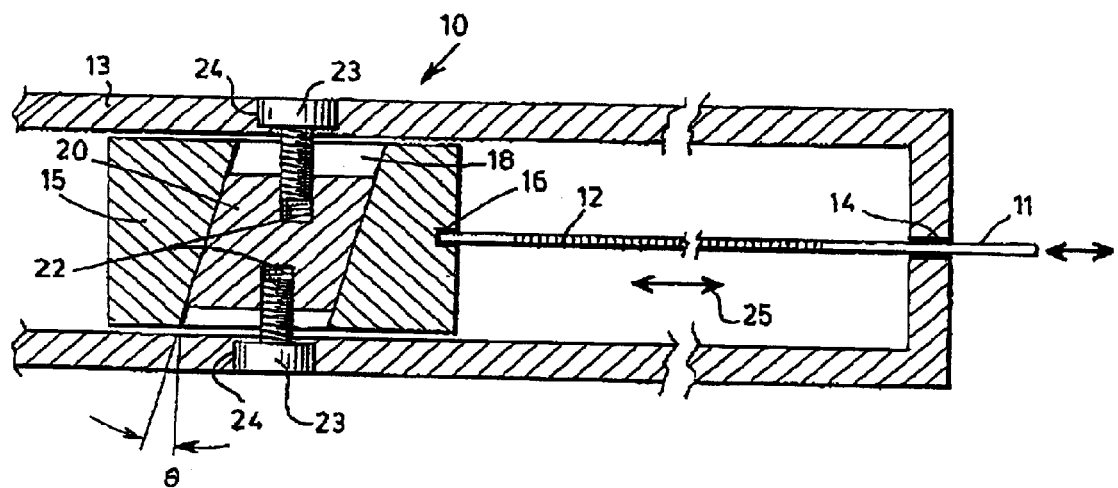

Referring to FIG. 1B, there is shown a second preferred embodiment of the invention where two screws 23 are provided opposite each other. Corresponding screw holes 24 and threaded cavities 22 are also provided on opposite sides of the hollow structure 13 and wedge member 20. In this case, loosening one screw and tightening the other in sequence will induce the transversal displacement of the wedge member 20 and corresponding longitudinal movement of the sliding member 15. Once the desired tuning of the grating is achieved, the longitudinal position of the wedged member 20 is secured by tightening both screws 23. Since they are facing each other, proper tightening will make for an equilibrated and solid tension. In this case, it is not necessary to provide separate means of preventing the screws 23 from coming out of the screw holes 24, but a collar such as shown in FIG. 2 or equivalent means could optionally be added.

Figure 3:
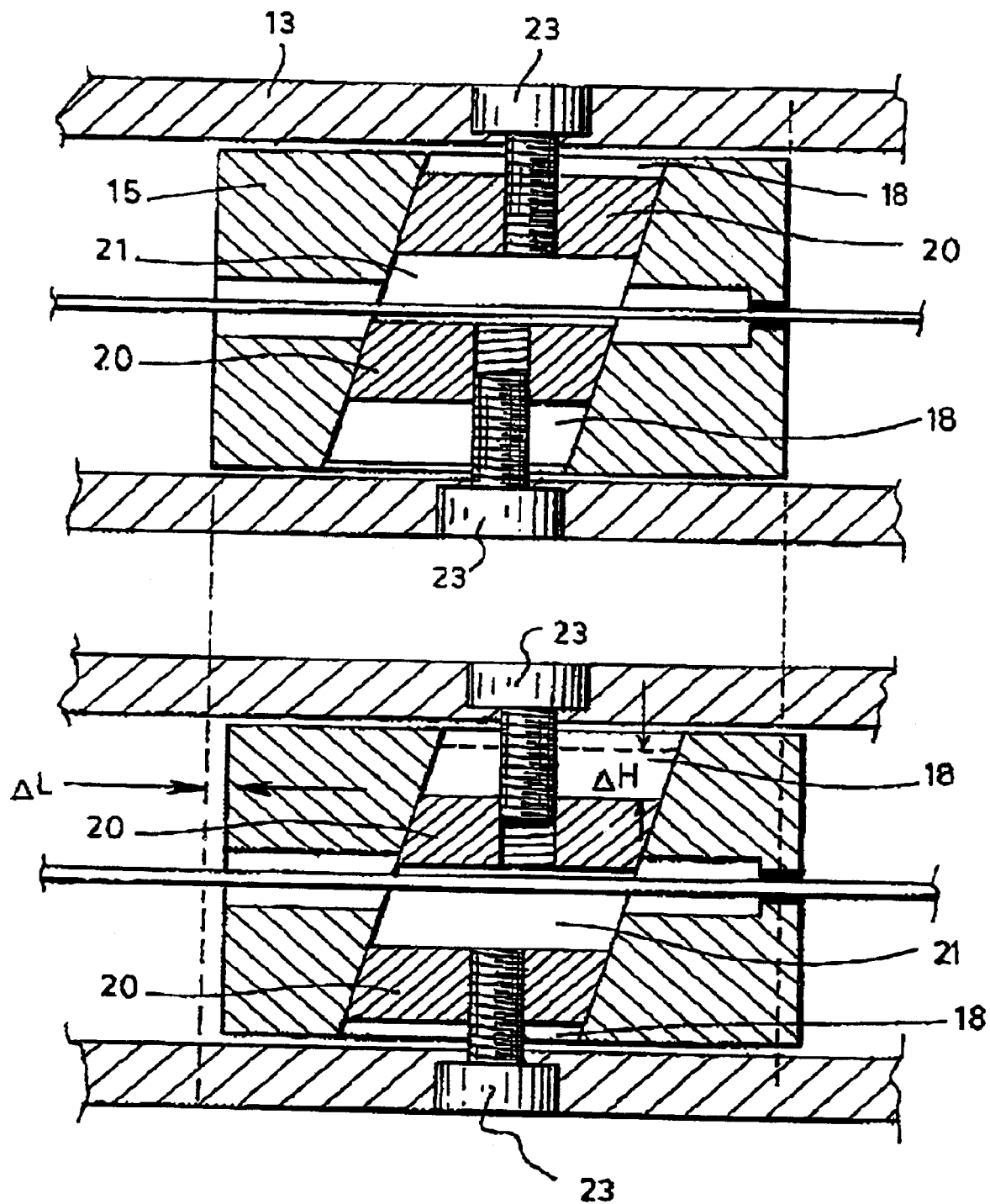
FIG. 3 are partial side views of the assembly of FIG. 1C, respectively before and after a displacement of the sliding member within the hollow structure.

Referring to FIGS. 1C and 3, there is shown a third preferred embodiment of the invention, also having two opposed screws 23. In this particular case, the optical fiber 11 crosses the hollow structure 13 completely. Preferably, to allow passage of the optical fiber 11, the sliding member 15 has a longitudinal bore 17 therethrough aligned with the mounting axis of the fiber, and the wedge member 20 has a hollow portion 21 therein also aligned with the fiber's axis. To avoid interference of the wedge member 20 with the fiber 11 when the wedge member is displaced, the hollow portion 21 should be wide enough so that the wedge member does not contact the fiber for all of the allowed range of movement of the wedge member 11. Alternatively, the wedge member may extend on just one side of the optical fiber axis so that it does not interfere therewith.

Advantageously, the above explained embodiments of the present invention allow a very small displacement of the sliding member 15, especially when the screw or screws have a high thread count and when the slant angle θ is small. The ratio of the displacements of the sliding member 15 along the longitudinal direction of the hollow structure 13 to that of the wedge member 20 in the transversal direction is given by the tangent of the slant angle θ. A very high resolution in the wavelength tuning is achievable by using a small angle θ, in comparison to that obtainable with a simple fine-thread screw used longitudinally to displace the sliding member.

In addition, the mechanical arrangement of this apparatus ensures that no twisting in the fiber 11 occurs as the wedge member 20 and sliding member 15 are moved, giving the invention a definite edge in accuracy and quality of fiber Bragg grating tuning.

A further definite advantage of this design is the permanent access to the adjustment screws 23, which allows the post-assembly fine-tuning of the Bragg wavelength. In WDM applications, this is particularly important as accuracy of the wavelength selective components permits more tolerance on the specification of expensive DFB laser sources for example.

An exemplary embodiment of the present invention was constructed following the particular configuration illustrated in FIG. 1C. A single mode optical fiber with a conventional FBG pass-band notch filter long was mounted under tension inside the prototype mechanism. A slanted passage with an angle of 1 degree was used for the test, being at the limit of actual practical mechanical machining. Screws with 0–80 threads were used, and long sleeve Allen keys were employed to tighten and loosen the adjustment screws. With such long levers used for tightening and loosening, sub-degree rotation of the screws was easily achieved.

Wavelength tuning was tested by setting back and forth the central wavelength of the grating spectral response to predetermined values. The absolute accuracy with this system reached 1 pm.

The resolution of the fine-tuning mechanism could be further improved by using screws with finer threads and a smaller slant angle. However, reducing the slant angle also reduces the tuning range. Nevertheless, the achieved accuracy was already near the limit of detection precision, showing the great potential of the invention.

Figure 4:
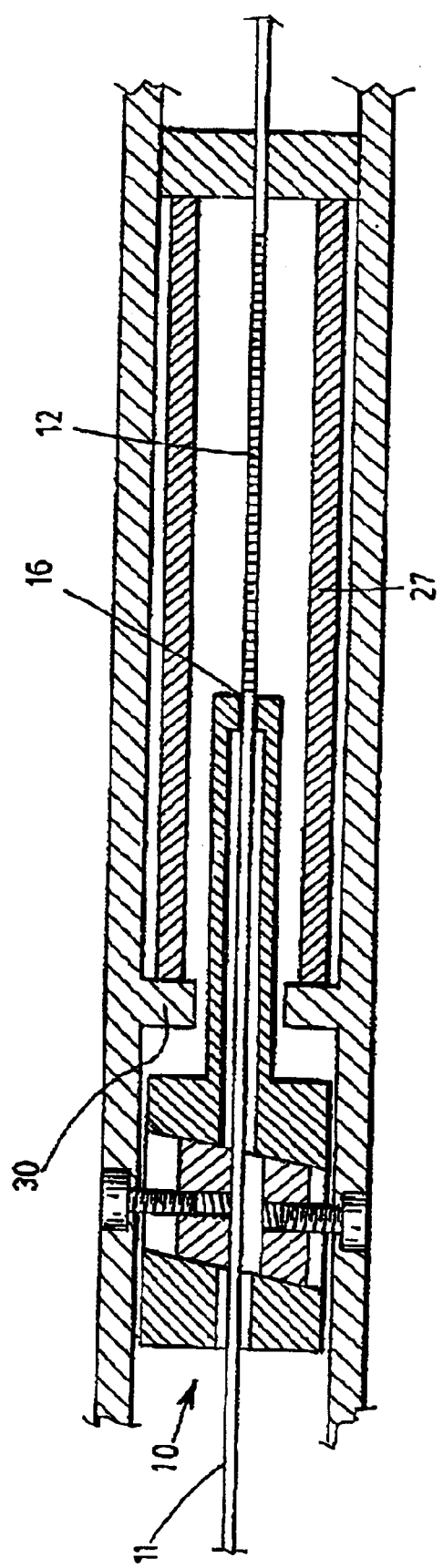
FIG. 4 is a cross-sectional side view of a fine-tunable grating assembly used for athermally packaging a fiber grating.

The present invention may also be used in the context of an athermally packaged optical grating. Such a device is for example disclosed in co-pending U.S. patent application Ser. No. 09/952,715, filed on Sep. 12, 2001 and assigned to the present assignee. This application is incorporated herein by reference. Referring to FIG. 4, there is shown an exemplary embodiment of such an athermally packaged device. Athermality is achieved by appropriately selecting the material and the length of each component of the device so that their respective coefficients of thermal expansion collectively compensate for temperature variations experienced by the system. As the fiber is maintained under tension in such a system, the present invention may advantageously be used to fine-tune this tension. In the present example, the sliding member 15 is generally T-shaped having a head and a body portion, and the hollow structure 13 has an inwardly projecting lip portion 30, the body portion of the sliding member projecting therethrough. In this manner, the lip portion 30 acts as a reference point of the athermal system. Such a configuration could also be advantageously used with the embodiment of FIGS. 1A, 1B and 1C.

The present invention therefore provides a very high accuracy mechanism for fine-tuning the characteristic spectral response of an optical filter inscribed in an optical fiber. The Bragg wavelength is tuned by mechanically straining the fiber in a well controlled manner. The fiber is fixed at two points on each side of the grating, one onto a hollow structure and the other one on a sliding member sliding inside the hollow structure. The position of the sliding member along the axis of the hollow structure is determined by the transverse position of a wedge member that can be moved inside the sliding member in a direction perpendicular to the axis of the hollow structure without interfering with the fiber. Preferably, adjustment screws are provided for controlling the transversal displacement of the wedge member. This invention can be used, for example, as an effective way to fine-tune the wavelength of a fiber Bragg grating in an athermal package. Moreover, this mechanism can be used as a post tuning mechanism for a packaged optical filter.

Of course, numerous modifications could be made to the embodiments described above without departing from the scope of the invention as defined in the appended claims.

What is claimed is:

1. A fine-tuning assembly for an optical grating provided in an optical fiber, said assembly comprising:

a hollow structure for mounting the optical fiber under tension therethrough along a longitudinal direction;

a sliding member slideable within said hollow structure along said longitudinal direction, said sliding member having a slanted passage extending therethrough at an angle with a transversal direction, the sliding member and hollow structure respectively having a first and a second anchor point for affixing the optical fiber thereto with the optical grating extending between said first and second anchor points;

a wedge member slideable within said slanted passage without interfering with said optical fiber; and transversal displacement means for transversally displacing said wedge member, thereby longitudinally sliding the sliding member within the hollow structure for finely adjusting the tension in the optical fiber and fine-tuning the optical grating.

2. The fine-tuning assembly according to claim 1, wherein the first anchor point is adapted to receive an extremity of the optical fiber.

3. The fine-tuning assembly according to claim 2, wherein said transversal displacement means comprise:

a screw;

a screw hole provided in the hollow structure for mounting the screw therethrough rotatably about the transversal direction while preventing movement of said screw in the longitudinal and transversal directions; and a transversal threaded cavity provided in the wedge member for threadedly receiving said screw.

4. The fine-tuning assembly according to claim 2, wherein said transversal displacement means comprise:

first and second screws;

opposed first and second screw holes provided in the hollow structure transversally allowing the respective first and second screws therethrough while preventing movement of said first and second screws in the longitudinal direction; and opposed first and second transversal threaded cavities provided in the wedge member for respectively and threadedly receiving said first and second screws.

5. The fine-tuning assembly according to claim 1, wherein said sliding member has a longitudinal bore for allowing the optical fiber therethrough.

6. The fine-tuning assembly according to claim 5, wherein said transversal displacement means comprise:

a screw;

a screw hole provided in the hollow structure for mounting the screw therethrough rotatably about the transversal direction while preventing movement of said screw in the longitudinal and transversal directions; and a transversal threaded cavity provided in the wedge member for threadedly receiving said screw.

7. The fine-tuning assembly according to claim 5, wherein the wedge member has a hollow portion therein for allowing the optical fiber therethrough.

8. The fine-tuning assembly according to claim 7, wherein said transversal displacement means comprise:

first and second screws;

opposed first and second screw holes provided in the hollow structure transversally allowing the respective first and second screws therethrough while preventing movement of said first and second screws in the longitudinal direction; and opposed first and second transversal threaded cavities provided in the wedge member for respectively and threadedly receiving said first and second screws.

9. The fine-tuning assembly according to claim 1, wherein the angle of the slanted passage with the transversal direction is smaller than 5 degrees.

10. The fine-tuning assembly according to claim 1, further comprising bonding means for bonding the optical fiber to the sliding member and hollow structure at said first and second anchor points.

11. The fine-tuning assembly according to claim 10, wherein said bonding means include an epoxy glue.

12. A fine-tunable optical grating assembly, comprising:

a hollow structure having a longitudinal direction and a transversal direction normal thereto;

an optical fiber having an optical grating therein and longitudinally mounted under tension in the hollow structure;

a sliding member inserted into said hollow structure and slideable therein along said longitudinal direction, the sliding member having a slanted passage extending therethrough at an angle with the transversal direction, the optical fiber being affixed to first and second anchor points respectively provided on the sliding member and hollow structure with the optical grating extending between said first and second anchor points;

a wedge member slideable within said slanted passage without interfering with said optical fiber; and transversal displacement means for transversally displacing said wedge member, thereby longitudinally sliding the sliding member within the hollow structure for finely adjusting the tension in the optical fiber and fine-tuning the optical grating.

13. The fine-tunable optical grating assembly according to claim 12, wherein an extremity of the optical fiber is affixed to the first anchor point.

14. The fine-tunable optical grating assembly according to claim 13, wherein said transversal displacement means comprise:

a screw;

a screw hole provided in the hollow structure, the screw extending therethrough and being rotatable about the transversal direction,, said screw hole preventing movement of said screw in the longitudinal and transversal directions; and a transversal threaded cavity provided in the wedge member threadedly receiving said screw.

15. The fine-tuning assembly according to claim 13, wherein said transversal displacement means comprise:

first and second screws;

opposed first and second screw holes provided in the hollow structure transversally receiving the respective first and second screws therethrough while preventing movement of said first and second screws in the longitudinal direction; and opposed first and second transversal threaded cavities provided in the wedge member respectively and threadedly receiving said first and second screws.

16. The fine-tuning assembly according to claim 12, wherein said sliding member has a longitudinal bore allowing the optical fiber therethrough.

17. The fine-tuning assembly according to claim 16, wherein said transversal displacement means comprise:

a screw;

a screw hole provided in the hollow structure transversally, the screw extending therethrough and being rotatable about the transversal direction said screw hole preventing movement of said screw in the longitudinal and transversal directions; and a transversal threaded cavity provided in the wedge member threadedly receiving said screw.

18. The fine-tuning assembly according to claim 16, wherein the wedge member has a hollow portion therein allowing the optical fiber therethrough.

19. The fine-tuning assembly according to claim 18, wherein said transversal displacement means comprise:

first and second screws;

opposed first and second screw holes provided in the hollow structure transversally receiving the respective first and second screws therethrough while preventing movement of said first and second screws in the longitudinal direction; and opposed first and second transversal threaded cavities provided in the wedge member respectively and threadedly receiving said first and second screws.

20. The fine-tuning assembly according to claim 12, wherein the angle of the slanted passage with the transversal direction is smaller than 5 degrees.

21. The fine-tuning assembly according to claim 12, further comprising bonding means for bonding the optical fiber to the sliding member and hollow structure at said first and second anchor points.

22. The fine-tuning assembly according to claim 21, wherein said bonding means include an epoxy glue.

* * * * *